J. MILLER.
Seed-Planter.
No. 16,930.　　　　　　　　　　　　　　　　Patented Mar. 31. 1857.
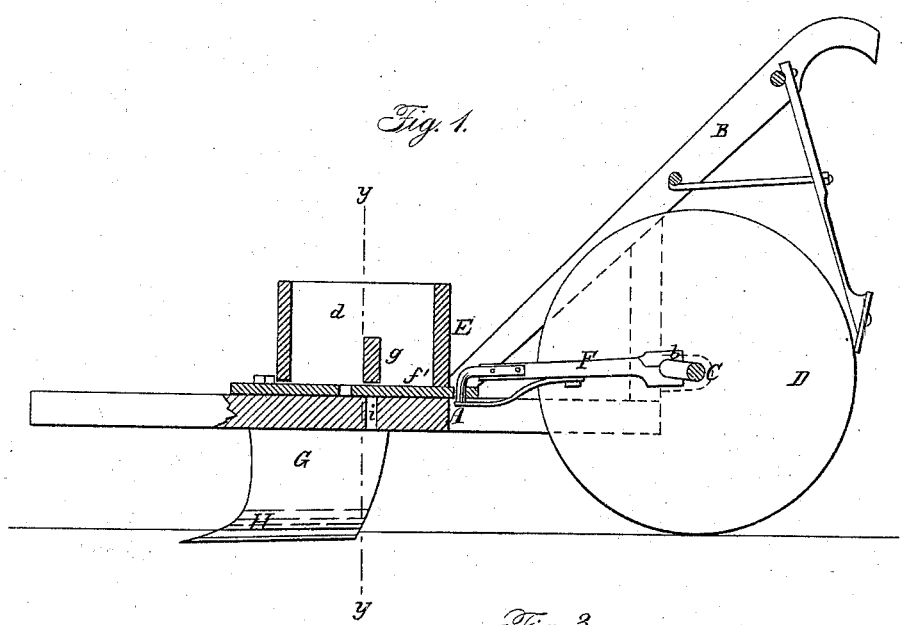
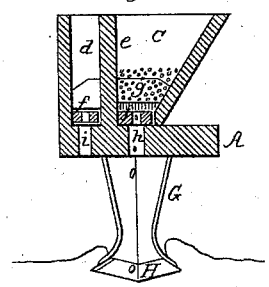
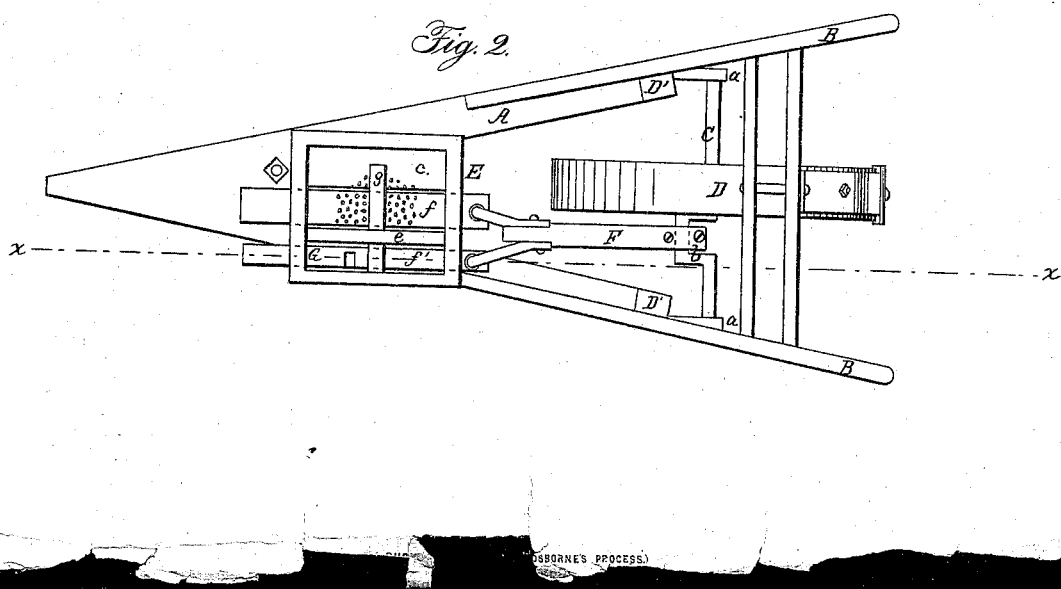

UNITED STATES PATENT OFFICE.

JOHN MILLER, OF BUCYRUS, OHIO.

IMPROVEMENT IN CORN-PLANTERS.

Specification forming part of Letters Patent No. 16,930, dated March 31, 1857.

*To all whom it may concern:*

Be it known that I, JOHN MILLER, of Bucyrus, in the county of Crawford and State of Ohio, have invented a new and useful Improvement in Machines for Planting Corn and other Seeds; and I do hereby declare that the following is a full, clear, and exact description of the same, reference being had to the annexed drawings, making a part of this specification, in which—

Figure 1 is a longitudinal vertical section of my improvement, $x\ x$, Fig. 2, showing the plane of section. Fig. 2 is a plan or top view of the same. Fig. 3 is a transverse vertical section of the same, $y\ y$, Fig. 1, showing the plane of section.

Similar letters of reference indicate corresponding parts in the several figures.

This invention consists in the peculiar means employed for marking the hills or drills as they are planted or the seed deposited in them, so that the hills or drills are rendered visible, and the operator thereby enabled to plant the seed in parallel drills at equal distances apart or in hills in check-rows, as will be hereinafter fully shown and described.

To enable those skilled in the art to fully understand and construct my invention, I will proceed to describe it.

A represents a horizontal V-shaped frame, having two handles, B B, at its back end.

C is a shaft, which has its bearings in arms $a\ a$, attached to uprights D D at the back end of the frame A. On this shaft a wheel, D, is placed, and a crank, $b$, is also formed on this shaft.

On the frame A, at about its center, a box, E, is placed. This box is divided into two compartments, $c\ d$, by a vertical partition, $e$. At the bottom of each compartment a perforated slide is placed, the slide $f$ being at the bottom of the compartment $c$ and the slide $f'$ at the bottom of the compartment $d$. Both of these slides are connected at one end to a rod, F, which is attached to the crank $b$ on the shaft C.

Within the box E, at its lower part, and just above the slides $f\ f'$, a transverse bar, $g$, is placed. This bar serves as a cut-off, and its under side may have brushes attached. The seed to be planted or sown is placed within the compartment $c$, and pulverized gypsum or slaked lime is placed within the compartment $d$.

To the under side of the frame A an upright stock, G, is attached. This stock at its back is recessed or grooved, and an aperture, $h$, is made through the frame A directly over the recess or groove in the stock, the aperture $h$ being underneath the slide $f$ in the compartment $c$. An aperture, $i$, is also made through the frame A underneath the slide $f'$ in the compartment $d$. The apertures $h\ i$ are directly underneath or in line with the bar $g$.

To the lower end of the stock G a share, H, is attached. The aperture $i$ is at one side of the stock G, as shown plainly in Fig. 3.

From the above description of parts it will be seen that as the implement is drawn along the two slides $f\ f'$ will be operated simultaneously, and the seed will be dropped from the compartment $c$ into the furrow made by the share H, and by the side of the furrow a quantity of gypsum or lime will be dropped from the compartment $d$, the lime or gypsum being dropped simultaneously with the seed, and indicating the precise spot where the seed is deposited, the lime or gypsum not being covered by the earth. By this mode of marking or designating the precise spots or places where the seed is deposited the hills or drills may be made perfectly parallel with each other, because the operator or person having hold of the handles and driving the team can, in consequence of the places being shown where the seed is planted, direct the implement so that the spaces between the hills or drills will be of equal width.

I do not claim the perforated and reciprocating slides $f\ f'$ for measuring and distributing the seed and gypsum or lime, for they are well known and commonly used; but,

Having thus described my invention, what I claim as new, and desire to secure by Letters Patent, is—

The auxiliary compartment $d$, having a slide, $f'$, acting simultaneously with the seed-slide $f$, arranged and operating as described, for the purpose of designating the point of planting, as set forth.

JOHN MILLER.

Witnesses:
JOHN SMITH,
MOSES LINDSEY.